United States Patent
Erell et al.

(10) Patent No.: US 8,537,802 B2
(45) Date of Patent: Sep. 17, 2013

(54) CHANNEL MEASUREMENTS IN AGGREGATED-SPECTRUM WIRELESS SYSTEMS

(75) Inventors: Adoram Erell, Herzliya (IL); Daniel Yellin, Ra'anana (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 460 days.

(21) Appl. No.: 12/499,807

(22) Filed: Jul. 9, 2009

(65) Prior Publication Data
US 2010/0020852 A1   Jan. 28, 2010

Related U.S. Application Data

(60) Provisional application No. 61/083,047, filed on Jul. 23, 2008.

(51) Int. Cl.
*H04J 3/00* (2006.01)

(52) U.S. Cl.
USPC ........... 370/345; 370/332; 370/341; 370/252; 714/776

(58) Field of Classification Search
USPC ............... 370/331, 329, 328, 332, 341, 252; 375/141, 131, 219, 224, 130, 148
See application file for complete search history.

(56) References Cited

U.S. PATENT DOCUMENTS

| | | | |
|---|---|---|---|
| 6,512,750 B1 | 1/2003 | Palenius | |
| 6,757,319 B1 * | 6/2004 | Parsa et al. | 375/141 |
| 6,768,727 B1 * | 7/2004 | Sourour et al. | 370/335 |
| 7,184,791 B2 | 2/2007 | Nilsson et al. | |
| 2001/0019577 A1 * | 9/2001 | Ha | 375/148 |
| 2006/0045062 A1 | 3/2006 | Gorokhov et al. | |
| 2006/0274712 A1 * | 12/2006 | Malladi et al. | 370/345 |
| 2007/0110100 A1 * | 5/2007 | Wunder et al. | 370/468 |
| 2007/0141994 A1 * | 6/2007 | Cheng | 455/69 |
| 2007/0149229 A1 | 6/2007 | Frederiksen et al. | |
| 2007/0183591 A1 * | 8/2007 | Geile et al. | 379/362 |
| 2007/0253466 A1 | 11/2007 | Jones et al. | |
| 2007/0259671 A1 * | 11/2007 | Cheng et al. | 455/452.2 |
| 2008/0081655 A1 | 4/2008 | Shin et al. | |

(Continued)

FOREIGN PATENT DOCUMENTS

| | | |
|---|---|---|
| EP | 0955736 A2 | 11/1999 |
| EP | 1898540 A1 | 3/2008 |

(Continued)

OTHER PUBLICATIONS

International Application PCT/IB09/52987 Search Report dated Jan. 27, 2010.

(Continued)

*Primary Examiner* — Rasheed Gidado

(57) ABSTRACT

A communication terminal includes a receiver, a transmitter and control circuitry. The receiver is configured to receive an aggregated-spectrum downlink signal including two or more component carriers in respective spectral bands. The transmitter is configured to transmit an uplink signal to a serving base station that serves the communication terminal. The control circuitry is configured to evaluate respective channel measures of the two or more component carriers of the aggregated-spectrum downlink signal and to transmit to the serving base station a report, which is based on the channel measures and includes a respective channel quality metric for each of at least two of the component carriers.

17 Claims, 3 Drawing Sheets

(56) References Cited

U.S. PATENT DOCUMENTS

| | | | |
|---|---|---|---|
| 2008/0108365 A1* | 5/2008 | Buddhikot et al. | 455/452.1 |
| 2008/0207135 A1* | 8/2008 | Varadarajan et al. | 455/69 |
| 2008/0229177 A1* | 9/2008 | Kotecha | 714/776 |
| 2009/0163157 A1 | 6/2009 | Zolfghari | |
| 2009/0224973 A1 | 9/2009 | Nayyar | |
| 2009/0257533 A1* | 10/2009 | Lindoff et al. | 375/344 |
| 2009/0258628 A1* | 10/2009 | Lindoff et al. | 455/302 |
| 2009/0264120 A1 | 10/2009 | Karabinis | |
| 2009/0279480 A1* | 11/2009 | Rosenqvist et al. | 370/328 |
| 2009/0300456 A1* | 12/2009 | Pelletier et al. | 714/749 |
| 2009/0316659 A1* | 12/2009 | Lindoff et al. | 370/332 |
| 2010/0172279 A1 | 7/2010 | Chen et al. | |

FOREIGN PATENT DOCUMENTS

| | | |
|---|---|---|
| EP | 2012552 A1 | 1/2009 |
| WO | 97/02665 A2 | 1/1997 |
| WO | 00/01084 A1 | 1/2000 |

OTHER PUBLICATIONS

Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0 (Jun. 2004), Sophia Antipolis, France.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A', 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
NTT Docomo et al., "Prioritized Deployment Scenarios for LTE-Advanced Studies", 3GPP TSG RAN WG4 Meeting # 50, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3rd Generation Partnership Project; Technical Specification Group Radio Access Network; Further Advancements for E-UTRA Physical Layer Aspects (Release 9), 3GPP TR 36.814 V0.4.1 (Feb. 2009), Sophia Antipolis, France.
3rd Generation Partnership Project; Technical Specification Group Radio Access Network; Evolved Universal Terrestrial Radio Access (E-UTRA); Physical Later Procedures (Release 8), Draft 3GPP TS 36.213 V8.6.0, Sophia Antipolis, France, 2009.
Huawei, "The Impact of CA on Mobility in LTE-A", 3GPP TSG RAN WG1 Meeting #56, Athens, Greece, Feb. 9-13, 2009.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1 (Mar. 2009), Sophia Antipolis, France, 2009.
3rd Generation Partnership Project; Technical Specification Group Radio Access Network; Evolved Universal Terrestrial Radio Access (E-UTRA); Physical layer procedures (Release 8), 3GPP TS 36.213 V8.4.0 (Sep. 2008), Sophia Antipolis, France.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1 (Jan. 2009), Sophia Antipolis, France.
Ericsson, "Carrier Aggregation in LTE-Advanced", TSG-RAN WG1 #53bis, Warsaw, Poland, Jun. 30-Jul. 4, 2008.
Alcatel-Lucent, "Fractional power Control using Pilot Power Ratio Measurements for the E-UTRA Uplink", 3GPP TSG-RAN WG1 #48, St. Louis, USA, Feb. 12-16, 2007.
Motorola, "Uplink Power Control for E-UTRA", 3GPP TSG RAN1 #48, St. Louis, USA, Feb. 12-16, 2007.
Motorola, "Interference Mitigation via Power Control and FDM Resource Allocation and UE Alignment for E-UTRA Uplink and TP", 3GPP TSG RAN1 #44, Denver, USA, Feb. 13-17, 2006.
Rapporteur (NTT DOCoMo), "Text proposal for RAN1 TR on LTE-Advanced", 3GPP TSG RAN WG1 Meeting #53bis, Warsaw, Poland, Jun. 30-Jul. 4, 2008.
Perets et al., U.S. Appl. No. 12/348,375 "Uplink power control in aggregated spectrum" (not yet published), filed Jan. 5, 2009.
Zaslavky et al., U.S. Appl. No. 12/397,366 "Power Control Using Fast Signal Envelope Detection" (not yet published), filed Mar. 4, 2009.
International Application PCT/IB2009/053164 Search Report dated Aug. 4, 2011.
U.S. Appl. No. 13/168,978, filed Jun. 26, 2011.
U.S. Appl. No. 12/348,375 Official Action dated Jun. 21, 2011.
U.S. Appl. No. 12/348,375 Official Action dated Sep. 15, 2011.
European Patent Application # 09797612.0 Extended Search Report dated Feb. 3, 2012.
Jarot et al., "Each Carrier Transmission Power Control for the Reverse Link of OFDM-DS-CDMA System", IEICE Transactions on Communications, vol. E82-B, No. 11, pp. 1851-1857, Nov. 1, 1999.
U.S. Appl. No. 13/400,078 Official Action dated May 1, 2012.
JP Patent Application # 2011519272 Office Action dated Sep. 11, 2012.
EP Patent Application # 09797612.0 Office Action dated Aug. 22, 2012.
NTT DOCOMO, Inc., "Proposals for LTE-Advanced Technologies", 3GPP TSG RAN WG1 Meeting # 53, Kansas City, USA, May 5-9, 2008.
International Application PCT/IB2011/052803 Search Report dated Dec. 2, 2011.
JP Patent Application No. 2011-518043 Office Action dated Oct. 23, 2012.
Japanese Patent Application # 2011519272 Office Action dated Mar. 26, 2013.

* cited by examiner

CHANNEL MEASUREMENTS IN AGGREGATED-SPECTRUM WIRELESS SYSTEMS

CROSS-REFERENCE TO RELATED APPLICATIONS

This application claims the benefit of U.S. Provisional Patent Application 61/083,047, filed Jul. 23, 2008, whose disclosure is incorporated herein by reference.

FIELD OF THE INVENTION

The present invention relates generally to communication systems, and particularly to methods and systems for performing and signaling channel measurements.

BACKGROUND OF THE INVENTION

Some communication systems employ spectrum aggregation techniques, in which a wireless terminal communicates with a base station over multiple aggregated carriers to provide high bandwidth capabilities. The use of spectrum aggregation is contemplated, for example, in Long Term Evolution Advanced (LTE-A) systems that are being specified by the 3 Generation Partnership Project (3GPP). LTE-A is addressed, for example, in 3GPP Technical Report 36.913, entitled "Technical Specification Group Radio Access Network; Requirements for Further Advancements for Evolved Universal Terrestrial Radio Access (E-UTRA)," (TR 36.913), version 8.0.1, March, 2009, which is incorporated herein by reference.

Spectrum aggregation is also described in 3GPP Technical Specification Group Radio Access Network Working Group 1 (TSG-RAN WG1) report R1-082468, entitled "Carrier Aggregation in LTE-Advanced," Warsaw, Poland, Jun. 30-Jul. 4, 2008, which is incorporated herein by reference.

SUMMARY OF THE INVENTION

An embodiment of the present invention provides a communication terminal including a receiver, a transmitter and control circuitry. The receiver is configured to receive an aggregated-spectrum downlink signal including two or more component carriers in respective spectral bands. The transmitter is configured to transmit an uplink signal to a serving base station that serves the communication terminal. The control circuitry is configured to evaluate respective channel measures of the two or more component carriers of the aggregated-spectrum downlink signal and to transmit to the serving base station a report, which is based on the channel measures and includes a respective channel quality metric for each of at least two of the component carriers.

In an embodiment, the receiver is configured to receive the aggregated-spectrum downlink signal from the serving base station, and the control circuitry is configured to evaluate the channel measures separately for each of the component carriers of the aggregated-spectrum signal received from the serving base station. In another embodiment, the receiver is configured to receive the aggregated-spectrum downlink signal from a neighbor base station, different from the serving base station, and the control circuitry is configured to evaluate the channel measures separately for each of the component carriers of the aggregated-spectrum signal received from the neighbor base station.

In some embodiments, the control circuitry is configured to jointly compress the channel quality metrics of the component carriers, and to transmit the jointly-compressed channel quality metrics in the uplink signal to the serving base station. In a disclosed embodiment, the control circuitry is configured to evaluate at least first and second different types of the channel measures, and to jointly compress the channel quality metrics corresponding to the first type separately from the channel quality metrics corresponding to the second type. In another embodiment, the control circuitry is configured to compress the channel quality metrics by reporting one or more differences in the channel measures from a reference channel measure evaluated on a reference component carrier. The control circuitry may be configured to evaluate the channel measures on the component carriers received from at least two base stations, and to select the component carriers occupying the same spectral band in the at least two base stations to serve as reference component carriers.

In an embodiment, the channel measures include Received Signal Strength Indications (RSSIs), and the control circuitry is configured to evaluate the RSSIs. Additionally or alternatively, the channel measures include Reference Signal Received Power (RSRP) levels, and the control circuitry is configured to evaluate the RSRP levels. In some embodiments, the receiver is configured to receive the component carriers in at least two non-contiguous spectral bands, and the control circuitry is configured to evaluate the channel measures of the component carriers received in the non-contiguous spectral bands.

There is additionally provided, in accordance with an embodiment of the present invention, a base station including a receiver and a processor. The receiver is configured to receive from a communication terminal a report including two or more channel quality metrics, each channel quality metric corresponding to a respective component carrier of an aggregated-spectrum signal that was evaluated by the communication terminal. The processor is configured to modify communication with the communication terminal responsively to the report.

In an embodiment, the processor is configured to select, responsively to the report, a cell to which the communication with the communication terminal is to be handed-off. Additionally or alternatively, the processor is configured to modify an allocation of the component carriers from the base station to the communication terminal responsively to the report.

There is also provided, in accordance with an embodiment of the present invention, a method for communication in a communication terminal. The method includes receiving an aggregated-spectrum downlink signal including two or more component carriers in respective spectral bands. Respective channel measures of the two or more component carriers are evaluated. A report is transmitted to a serving base station that serves the communication terminal. The report is based on the channel measures and includes a respective channel quality metric for each of at least two of the component carriers.

There is further provided, in accordance with an embodiment of the present invention, a method for communication in a base station. The method includes receiving from a communication terminal a report including two or more channel quality metrics, each channel quality metric corresponding to a respective component carrier of an aggregated-spectrum signal that was evaluated by the communication terminal. Communication with the communication terminal is modified responsively to the report.

The present invention will be more fully understood from the following detailed description of the embodiments thereof, taken together with the drawings in which:

DETAILED DESCRIPTION OF EMBODIMENTS

Embodiments of the present invention that are described hereinbelow provide improved methods and systems for performing and signaling channel measurements in aggregated-spectrum communication systems, such as LTE-A systems. In these methods and systems, a wireless communication terminal communicates with a certain Base Station (BS), which is referred to as the terminal's serving BS. The terminal performs channel measurements on an aggregated-spectrum downlink signal transmitted from a certain BS, which may be the serving BS or one or more neighbor BSs.

The measured downlink signal comprises two or more component carriers, which may be transmitted in contiguous or non-contiguous spectral bands. The terminal evaluates a channel measure, such as Received Signal Strength Indication (RSSI) and/or Reference Signal Received Power (RSRP), for each individual component carrier of the measured downlink signal. The terminal then sends to the serving BS a report, which indicates respective channel quality metrics of the individual component carriers of the measured downlink signal. In some embodiments, the terminal compresses the channel quality metrics, and sends them to the serving BS in compressed form. The report can be used by the serving BS to modify communication with the terminal, such as for selecting a BS or cell to which communication with the terminal is to be handed-off, or for modifying the set of component carriers allocated to the terminal.

It may be possible in principle to report to the serving BS only a single quality metric that applies to the entire aggregated-spectrum downlink signal. In practice, however, channel conditions often vary considerably from one component carrier to another, especially when the component carriers are non-contiguous. In such cases, a single quality metric may not reflect the genuine channel quality seen by the terminal, and may lead the BS to reach erroneous decisions (e.g., hand-off or spectrum allocation decisions). In the methods and systems described herein, on the other hand, the channel quality metrics reported by the terminal provide the serving BS with information as to the specific downlink quality in the individual component carriers (of the serving BS or of a neighbor BS). Using this level of detail, the serving BS can perform accurate and reliable hand-off and allocation decisions. Communication systems that use the disclosed techniques may thus achieve higher communication quality, capacity and spectrum efficiency.

Figure 1:
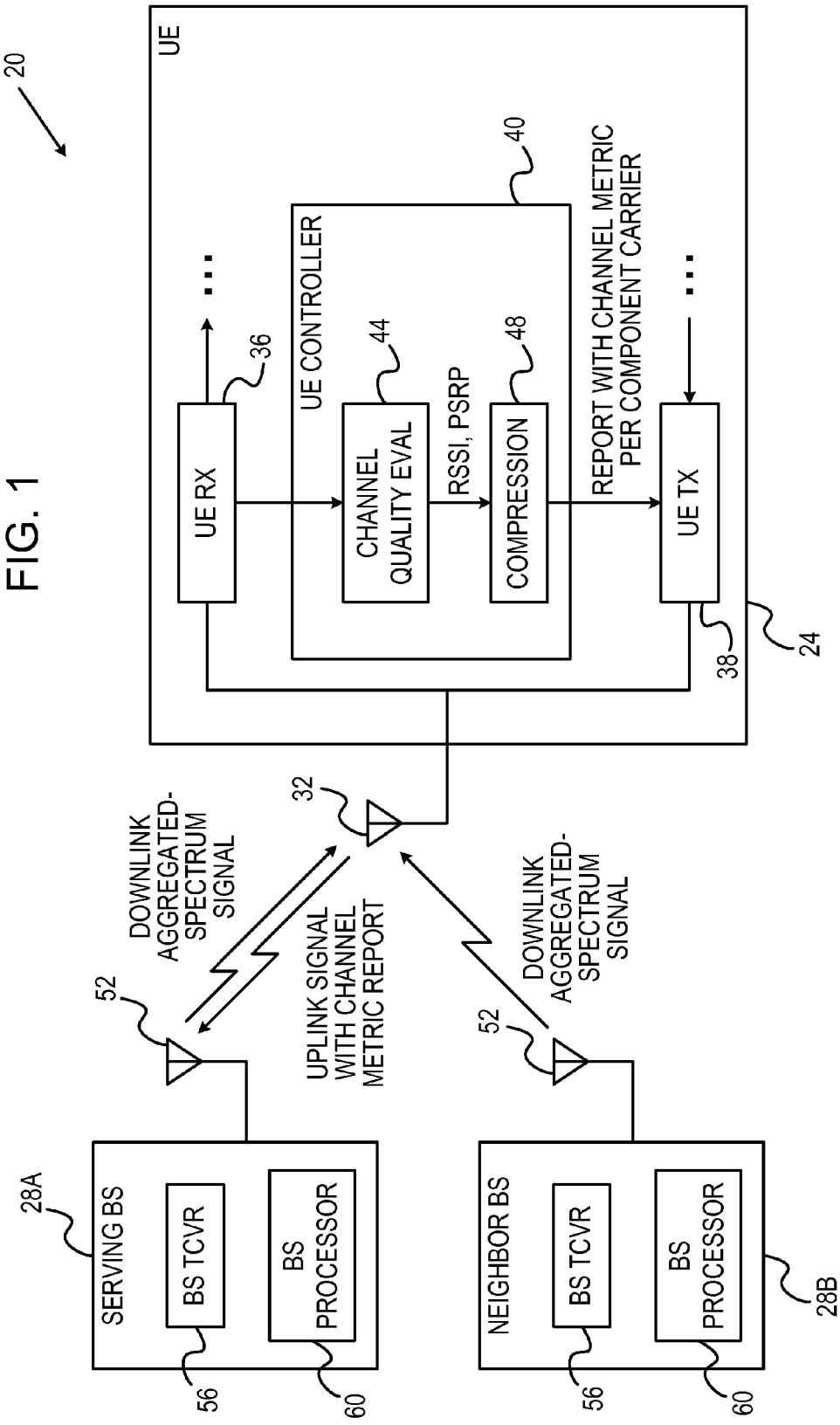
FIG. 1 is a block diagram that schematically illustrates a wireless communication employing spectrum aggregation, in accordance with an embodiment of the present invention.

FIG. 1 is a block diagram that schematically illustrates a wireless communication system 20 employing spectrum aggregation, in accordance with an embodiment of the present invention. System 20 comprises a wireless communication terminal 24 and two Base Stations (BSs) 28A and 28B. Terminal 24 may comprise any suitable type of communication terminal, such as a mobile phone, a wireless-enabled computer, or any other suitable communication or computing platform having wireless communication capabilities.

In the present example, system 20 operates in accordance with the LTE-A specifications, cited above. Following LTE-A terminology, terminal 24 is referred to as a User Equipment (UE), and the BSs are referred to as eNodeB. In alternative embodiments, system 20 may operate with any other suitable communication standard or protocol that uses spectrum aggregation, such as, for example, the IEEE 802.11 standard. In the example of FIG. 1 only a single UE and two BSs are seen for the sake of clarity. In practice, however, wireless communication systems typically comprise a large number of UEs and BSs.

At a given point in time, UE 24 communicates with BS 28A, which is therefore referred to as the serving BS of this UE. BS 28B typically comprises a neighbor BS, which is within communication range of UE 24. As will be explained below, UE 24 performs channel measurements on the downlink transmissions of the neighbor BS even though it is not its serving BS. It is noted that UE 24 may be within range of several neighbor BSs 28 and channel measurements may be performed on one or more neighbor BSs 28B. In some embodiments, the serving BS and neighbor BS may be collocated. For example, some base stations cover two or more geographical sectors using collocated equipment. The BS equipment associated with a certain sector is commonly referred to as a cell. In the present context, the cell with which the UE communicates is regarded as the serving BS, and other collocated cells are considered neighbor BSs. Alternatively, however, the neighbor BS may be located at a different site from the serving BS. The term "neighbor BS" refers to any BS, which is different from the serving BS and whose downlink signal can be received by the UE.

System 20 employs spectrum aggregation, meaning that UE 24 and its serving BS may communicate over multiple component carriers simultaneously. When using spectrum aggregation, the serving BS transmits to the UE a downlink signal, which comprises two or more aggregated spectral bands. Each spectral band is referred to herein as a component carrier. Each component carrier may comprise multiple sub-carriers, such as in LTE systems in which each carrier comprises multiple Orthogonal Frequency Division Multiplexing (OFDM) sub-carriers. Note that in some embodiments (e.g., OFDM), transmission within each carrier is performed in designated time/frequency bins. In some cases, the time bins allocated in different carriers do not necessarily overlap, even though the carriers are transmitted simultaneously. The term "simultaneously" should be understood as referring to such scenarios, as well.

The downlink signal destined to a particular UE may comprise an aggregation of any suitable number of component carriers. The component carriers may be transmitted in contiguous or non-contiguous spectral bands. When the component carriers transmitted to a certain UE are non-contiguous, the BS may use an intervening component carrier, whose frequency is between the non-contiguous component carriers, for simultaneous transmission to another UE. Typically, each carrier has a bandwidth in the range of 1.4-20 MHz, although other suitable bandwidths can also be used. Communication over multiple aggregated carriers provides high bandwidth, e.g., up to 100 MHz.

Typically, adjacent component carriers in a given aggregated-spectrum downlink signal are separated from one another in frequency by a suitable spectral guard band. In some aspects, each component carrier is operated and managed similarly to an independent carrier. For example, the component carriers in a given aggregated-spectrum downlink signal may have separate respective control channels.

UE 24 comprises a UE antenna 32, a receiver (RX) 36, a transmitter (TX) 38 and a controller 40. UE 24 receives a Radio Frequency (RF) aggregated-spectrum downlink signal from BS 28A or 28B using antenna 32. RX 36 down-converts the RF signal to baseband and extracts the data conveyed over the different component carriers. TX 38 transmits an uplink signal from UE 24 to serving BS 28A via antenna 32. In particular, TX 38 transmits in the uplink signal a report comprising channel quality metrics of respective individual component carriers of the downlink signals. This mechanism is addressed in detail below.

In some embodiments, the serving BS manages the communication with UE 24 based on the quality at which aggregated-spectrum downlink signals are received by the UE. The UE typically indicates the downlink reception quality to the serving BS by sending reports over the uplink. Generally, the UE may measure the downlink reception quality for the aggregated-spectrum signals transmitted from the serving BS and/or for any other BS within communication range (referred to as a "neighbor BS"). In the description that follows, a BS whose downlink signals are measured and reported by the UE is referred to as a measured BS.

The serving BS may modify communication with the UE based on the reported downlink quality. For example, the BS may select another BS to which communication with the UE is to be handed off. Additionally or alternatively, the serving BS may modify the selection of downlink component carriers allocated to the UE, and/or modify the respective power levels at which downlink component carriers are transmitted to the UE. Further additionally or alternatively, the serving BS may modify communication with the UE in any other suitable way based on the reported downlink quality.

Consider an aggregated-spectrum downlink signal sent from a given measured BS. In many practical scenarios, the downlink reception quality may vary considerably from one component carrier to another within this aggregated-spectrum downlink signal. The differences may be caused, for example, by differences in channel propagation characteristics (e.g., multipath fading) between different component carriers, by different noise or interference levels, or for any other reason. Significant differences in reception quality between different component carriers may exist particularly when the component carriers are transmitted in non-contiguous spectral bands. Nevertheless, differences may exist between adjacent component carriers, as well. For example, the difference in received signal level may differ by as much as 20 dB from one component carrier to another.

Given the above-mentioned differences, reporting only a single channel quality for the entire aggregated-spectrum downlink signal is often insufficient, and may lead to inaccurate or incorrect decisions of the serving BS. Thus, in some embodiments of the present invention, UE 24 measures and reports the downlink reception quality for individual component carriers, rather than for the entire aggregated-spectrum downlink signal.

In some embodiments, UE controller 40 comprises a channel quality evaluation module 44, which evaluates channel measures that are indicative of the reception quality of two or more individual component carriers in the downlink signal. Upon receiving an aggregated-spectrum downlink signal from a certain measured (serving or neighbor) BS, module 44 may evaluate a respective channel measure for each of at least two of the component carriers of that signal. The channel measure of a certain component carrier may comprise, for example, a Received Signal Strength Indication (RSSI), a Reference Signal Received Power (RSRP) or any other suitable channel measure. In some embodiments, module 44 may evaluate two or more different types of channel measures for the same component carrier.

In an embodiment, channel quality evaluation module 44 computes respective channel quality metrics of the component carriers based on the channel measures. The term "channel measures" refers to characteristics of the component carriers that are measured by module 44. The term "channel quality metrics" refers to values that are reported to the serving BS. In some embodiments, the UE may report the actual channel measures as channel quality metrics without further computation. In alternative embodiments, the channel quality metrics differ from the respective channel measures and are computed by module 44 using the channel measures. For example, module 44 may compute the ratio between the RSRP and RSSI of a given component carrier, and report this ratio to the serving BS as a channel quality metric. This calculation may be performed for each component carrier or for only a subset of the component carriers.

In some embodiments, UE controller 40 comprises a compression module 48, which compresses the channel quality metrics before reporting them over the uplink. Compressing the channel quality metrics reduces the signaling resources used for reporting the channel quality metrics over the uplink to the serving BS. For example, module 48 may select one of the component carriers as reference, and report the channel measure of this component carrier without compression. Module 48 may compress the channel quality metrics of the other component carriers in the aggregated-spectrum signal by reporting only the differences between their channel measures and the channel measure of the reference component carrier. Alternatively, any other suitable compression scheme can be used.

Typically, the compression applied by module 48 takes into account possible correlation or commonality between the channel measures of different component carriers in the same aggregated-spectrum signal. For example, since the different component carriers in a given aggregated-spectrum signal originate from the same BS and are received by the same UE, they share common channel characteristics (e.g., distance, terrain characteristics, number and location of multipath reflectors and scatterers). If shadowing (i.e., lack of direct line of sight) occurs in one component carrier, the other component carriers are also likely to experience shadowing, and vice versa. As another example, the channel rank (a term used in Multiple-Input Multiple-Output systems to indicate the number of independent data streams that can be transmitted over a given channel) is often similar for different component carriers belonging to the same spectrum-aggregated signal.

Because of these commonalities, the channel measures of different component carriers of a given aggregated-spectrum signal are expected to lie relatively close to one another in the range of possible metric values. As such, joint compression of these values is likely to be efficient.

As noted above, channel quality evaluation module 44 may produce channel measures of different types, such as RSSI and RSRP values. In an example implementation, module 44 may produce an RSSI measure and an RSRP measure for each component carrier. In some embodiments, compression module 48 applies separate compression to the measures of each type, since measures of different types sometimes assume considerably different value ranges.

For example, module 48 may report the raw RSSI and RSRP values of a selected reference component carrier. For the other component carriers in the aggregated-spectrum signal, module 48 may report the differences in RSSI values with respect to the RSSI of the reference component carrier. Similarly, module 48 may report the differences in RSRP values with respect to the RSRP of the reference component carrier.

Alternatively, module 48 may compress the channel measures jointly, irrespective of their type.

As noted above, UE 24 may produce and report channel measures for the downlink signal of its serving BS and/or for the downlink signal of a neighbor BS. Any desired component carriers can be selected in compressing the measures of the serving BS and of the neighbor BS. In some embodiments, module 48 selects the same component carrier index (i.e., component carriers lying in the same spectral band) to serve as a reference in compressing the measures of the serving BS and of the neighbor BS. This technique reduces the signaling needed for reporting the identities of the reference component carriers to the serving BS.

As seen in FIG. 1, each BS may comprise a BS antenna 52, a BS transmitter/receiver (transceiver) 56 and a BS processor 60. BS transceiver 56 transmits downlink aggregated-spectrum signals to UEs 24 and receives uplink signals from the UEs. In particular, transceiver 56 receives the reception quality reports sent by the UEs. BS processor 60 processes the reports received from the UEs over the uplink, and may modify communication with the UEs based on the received reports.

UE controller 40 and BS processor 60 may comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory. Additionally or alternatively, elements of controller 40 and processor 60 may be implemented in hardware or firmware, such as using Application-Specific Integrated Circuits (ASICs) or other hardware components.

The UE configuration shown in FIG. 1 is an example configuration, which is chosen for the sake of conceptual clarity. Moreover, UE elements that are not mandatory for understanding of the disclosed techniques have been omitted from FIG. 1 for the sake of clarity. In alternative embodiments, any other suitable UE configuration can be used. For example, the functions of RX 36 and TX 38 may be carried out by a combination of one or more Radio Frequency Integrated Circuits (RFIC) and one or more baseband ICs. As another example, evaluation of channel measures may be carried out by a modem that extracts downlink data from the received downlink signal.

Figure 2:
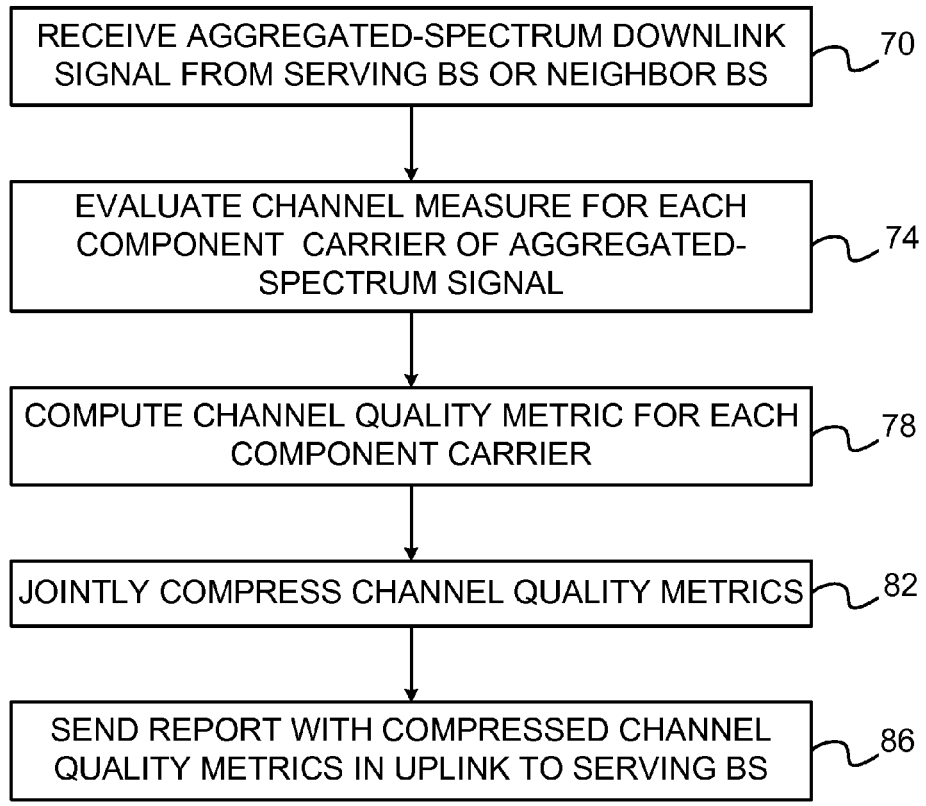
FIGS. 2-4 are flow charts that schematically illustrate methods for communication in an aggregated-spectrum communication system, in accordance with embodiments of the present invention.

FIG. 2 is a flow chart that schematically illustrates a method for communication in aggregated-spectrum communication system 20, in accordance with an embodiment of the present invention. The method begins with RX 36 of UE 24 receiving an aggregated-spectrum downlink signal from a certain BS, which may comprise the serving BS of UE 24 or a neighbor BS, at a downlink reception step 70. The received aggregated-spectrum downlink signal comprises multiple aggregated component carriers. For each of at least two of the individual component carriers, module 44 in UE 24 evaluates one or more channel measures (e.g., RSSI or RSRP), at a measure evaluation step 74. In some embodiments, module 44 computes respective channel quality metrics for each of the individual component carriers based on the channel measures, at a metric computation step 78. Module 48 in UE 24 compresses the channel quality metrics, at a compression step 82. Module 48 provides the compressed channel quality metrics to TX 38. TX 38 of UE 24 transmits a report comprising the compressed channel quality metrics over the uplink to the serving BS, at an uplink transmission step 86.

Figure 3:
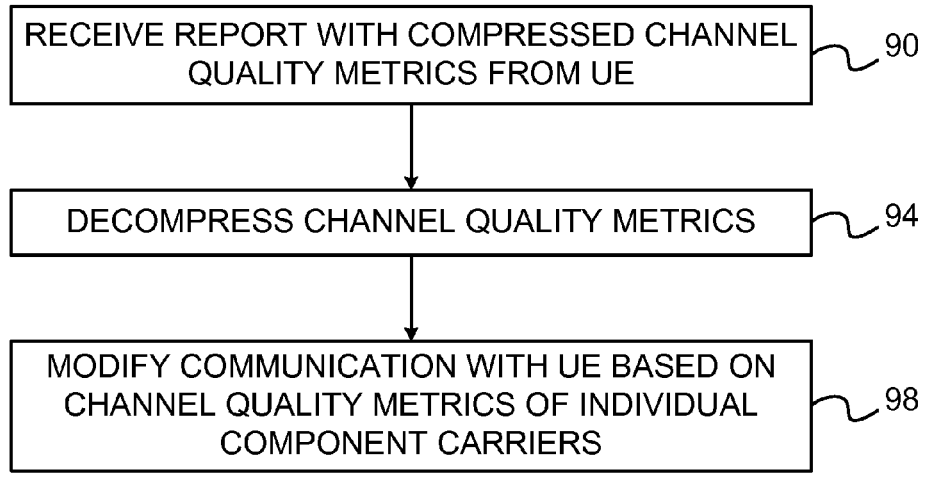

FIG. 3 is a flow chart that schematically illustrates a method for communication in aggregated-spectrum communication system 20, in accordance with an embodiment of the present invention. The method begins with transceiver 56 of a serving BS receiving a report from a certain served UE 24 over the uplink, at an uplink reception step 90. The report comprises channel quality metrics, which may be compressed and which indicate the reception quality of respective individual component carriers of an aggregated-spectrum downlink signal received by the UE from each of one or more measured BS. As explained above, the report may pertain to the serving BS itself, or to another BS. When the report is compressed, BS processor 60 of the serving BS decompresses the channel quality metrics reported for the various individual component carriers, at a decompression step 94.

The BS processor modifies communication with the UE based on the report, at a communication modification step 98. In some embodiments, the BS processor modifies communication with the UE in response to reports related to the serving BS and to one or more neighbor BSs. For example, the BS processor may determine that the UE is able to receive a certain neighbor BS at a better quality than it receives the serving BS, at least on some component carriers. In such a scenario, the serving BS may select this neighbor BS as a candidate for hand-off.

As another example, based on the report, the serving BS may determine that the component carriers that are currently allocated to the UE are not optimal, and that allocating a different set of component carriers by the serving BS is likely to achieve superior downlink reception quality. As a result, the BS processor may modify the allocation of component carriers to the UE. This allocation may be performed based on the requirements of a given UE, or based on network considerations pertaining to an allocation of component carriers among plural UEs. Additionally or alternatively, the BS processor may modify the communication with the UE in any other suitable way based on the reports.

Figure 4:
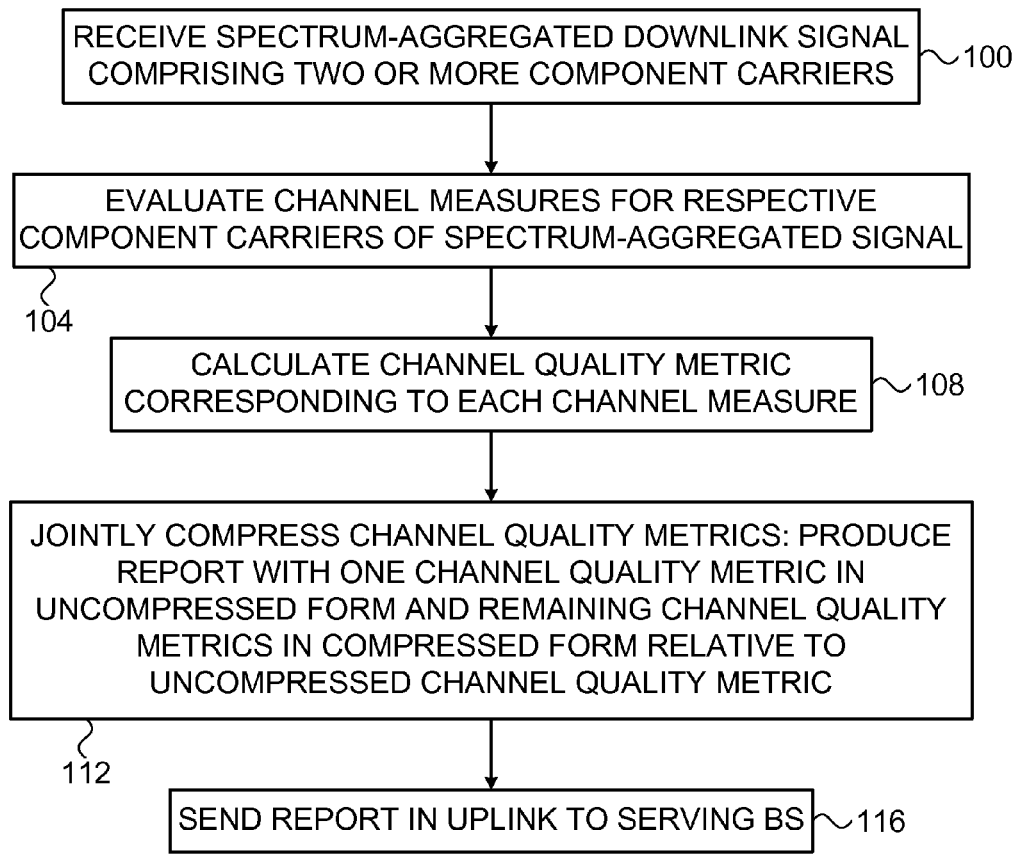

FIG. 4 is a flow chart that schematically illustrates a method for communication in an aggregated-spectrum communication system, in accordance with an embodiment that is described herein. The method begins with RX 36 of UE 24 receiving an aggregated-spectrum downlink signal that comprises two or more component carriers, at a reception operation 100. For each of at least two of the individual component carriers, module 44 in UE 24 evaluates one or more channel measures, at a channel measure evaluation operation 104. Module 44 calculates a respective channel quality metric for each individual component carrier based on the respective channel measure, at a quality metric calculation operation 108, in an embodiment. Module 48 in UE 24 applies joint compression to the channel quality metrics, at a joint compression operation 112. In an embodiment, module 48 produces a report that comprises one of the channel quality metrics in uncompressed form and the remaining channel quality metric(s) in compressed form relative to the uncompressed channel quality metric. TX 38 of UE 24 transmits the report comprising the jointly-compressed channel quality metrics over the uplink, at a transmission operation 116.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication terminal, comprising:

a receiver, which is configured to receive an aggregated-spectrum downlink signal comprising two or more component carriers in respective spectral bands;
a transmitter, which is configured to transmit an uplink signal to a serving base station that serves the communication terminal; and
control circuitry, which is configured to evaluate respective channel measures of the two or more component carriers of the aggregated-spectrum downlink signal, including at least first and second different types of the channel measures, to calculate channel quality metrics corresponding to the respective channel measures of at least two of the component carriers, to jointly compress the channel quality metrics corresponding to the channel measures of the first type, to jointly compress the channel quality metrics corresponding to the channel measures of the second type separately from the channel quality metrics corresponding to the first type, to produce a report that comprises the jointly-compressed channel quality metrics, and to transmit the report to the serving base station.

2. The terminal according to claim 1, wherein the receiver is configured to receive the aggregated-spectrum downlink signal from the serving base station, and wherein the control circuitry is configured to evaluate the channel measures separately for each of the component carriers of the aggregated-spectrum signal received from the serving base station.

3. The terminal according to claim 1, wherein the receiver is configured to receive the aggregated-spectrum downlink signal from a neighbor base station, different from the serving base station, and wherein the control circuitry is configured to evaluate the channel measures separately for each of the component carriers of the aggregated-spectrum signal received from the neighbor base station.

4. The terminal according to claim 1, wherein the control circuitry is configured to compress the channel quality metrics by reporting one or more differences in the channel measures from a reference channel measure evaluated on a reference component carrier.

5. The terminal according to claim 4, wherein the control circuitry is configured to evaluate the channel measures on the component carriers received from at least two base stations, and to select the component carriers occupying the same spectral band in the at least two base stations to serve as reference component carriers.

6. The terminal according to claim 1, wherein the channel measures comprise Received Signal Strength Indications (RSSIs), and wherein the control circuitry is configured to evaluate the RSSIs.

7. The terminal according to claim 1, wherein the channel measures comprise Reference Signal Received Power (RSRP) levels, and wherein the control circuitry is configured to evaluate the RSRP levels.

8. The terminal according to claim 1, wherein the receiver is configured to receive the component carriers in at least two non-contiguous spectral bands, and wherein the control circuitry is configured to evaluate the channel measures of the component carriers received in the non-contiguous spectral bands.

9. A base station, comprising:
a receiver, which is configured to receive from a communication terminal a report comprising two or more jointly-compressed channel quality metrics, each channel quality metric corresponding to a respective component carrier of an aggregated-spectrum signal that was evaluated by the communication terminal, wherein the report comprises the jointly-compressed channel quality metrics corresponding to a first type of the channel measures, and the jointly-compressed channel quality metrics corresponding to a second type of the channel measures that have been compressed separately from the channel quality metrics corresponding to the first type; and
a processor, which is configured to modify communication with the communication terminal responsively to the report.

10. The base station according to claim 9, wherein the processor is configured to select, responsively to the report, a cell to which the communication with the communication terminal is to be handed-off.

11. The base station according to claim 9, wherein the processor is configured to modify an allocation of the component carriers from the base station to the communication terminal responsively to the report.

12. A method for communication, comprising:
in a communication terminal, receiving an aggregated-spectrum downlink signal comprising two or more component carriers in respective spectral bands;
evaluating respective channel measures of the two or more component carriers, including at least first and second different types of the channel measures;
calculating channel quality metrics corresponding to the respective channel measures of at least two of the component carriers;
jointly compressing the channel quality metrics corresponding to the channel measures of the first type, and jointly compressing the channel quality metrics corresponding to the channel measures of the second type separately from the channel quality metrics corresponding to the first type, so as to produce a report that comprises the jointly-compressed channel quality metrics; and
transmitting the report to a serving base station that serves the communication terminal.

13. The method according to claim 12, wherein receiving the aggregated-spectrum downlink signal comprises receiving the signal from the serving base station, and wherein evaluating the channel measures comprises assessing the channel measures separately for each of the component carriers of the aggregated-spectrum signal received from the serving base station.

14. The method according to claim 12, wherein receiving the aggregated-spectrum downlink signal comprises receiving the signal from a neighbor base station, different from the serving base station, and wherein evaluating the channel measures comprises assessing the channel measures separately for each of the component carriers of the aggregated-spectrum signal received from the neighbor base station.

15. A method for communication, comprising:
in a base station, receiving from a communication terminal a report comprising two or more jointly-compressed channel quality metrics, each channel quality metric corresponding to a respective component carrier of an aggregated-spectrum signal that was evaluated by the communication terminal, wherein the report comprises the jointly-compressed channel quality metrics corresponding to a first type of the channel measures, and the jointly-compressed channel quality metrics corresponding to a second type of the channel measures that have been compressed separately from the channel quality metrics corresponding to the first type; and
modifying communication with the communication terminal responsively to the report.

16. The method according to claim 15, wherein modifying the communication comprises selecting, responsively to the report, a cell to which the communication with the communication terminal is to be handed-off.

17. The method according to claim 15, wherein modifying the communication comprises modifying an allocation of the component carriers from the base station to the communication terminal responsively to the report.

* * * * *